US007011765B2

(12) United States Patent
Commandeur

(10) Patent No.: US 7,011,765 B2
(45) Date of Patent: Mar. 14, 2006

(54) HEAT TRANSFER FLUID BASED ON POLYPHENYLMETHANES EXHIBITING IMPROVED THERMAL STABILITY

(75) Inventor: Raymond Commandeur, Vizille (FR)

(73) Assignee: Arkema, Paris la Defense Cedex (FR)

( * ) Notice: Subject to any disclaimer, the term of this patent is extended or adjusted under 35 U.S.C. 154(b) by 332 days.

(21) Appl. No.: 10/240,093

(22) PCT Filed: Mar. 27, 2001

(86) PCT No.: PCT/FR01/00930

§ 371 (c)(1),
(2), (4) Date: Jan. 17, 2003

(87) PCT Pub. No.: WO01/72924

PCT Pub. Date: Oct. 4, 2001

(65) Prior Publication Data

US 2004/0031949 A1    Feb. 19, 2004

(30) Foreign Application Priority Data

Mar. 29, 2000  (FR)  .................................. 00 03944

(51) Int. Cl.
C09K 5/00 (2006.01)

(52) U.S. Cl. ........................ 252/73; 165/1; 165/104.11; 165/104.19; 585/1

(58) Field of Classification Search ................ 252/73; 165/1, 104.11, 104.19; 585/1
See application file for complete search history.

(56) References Cited

U.S. PATENT DOCUMENTS

| 4,895,990 A | * | 1/1990 | Sargent et al. ............... 570/130 |
| 4,957,815 A | * | 9/1990 | Commandeur et al. .. 428/402.2 |
| 5,192,463 A |   | 3/1993 | Berger et al. |
| 5,384,058 A | * | 1/1995 | Commandeur et al. ....... 252/73 |
| 5,593,613 A |   | 1/1997 | Commandeur et al. |

FOREIGN PATENT DOCUMENTS

| EP | 0384818 | 8/1990 |
| EP | 0500435 | 8/1992 |
| JP | 49105781 | 10/1974 |
| WO | WO 9850483 | 11/1998 |

OTHER PUBLICATIONS

Commandeur et al. "Une nouvelle famille de fluids thermiques haules performances," Informations Chimie, 1996, pp. 93-96, vol. 376, France.
Database WPI, Section Ch, Week 197521, Derwent Publications Ltd., London, GB.
Cuthbert J. et al. "Eine frage der staee. Auswahikriterlen fuer waermetraegerfluessigkelten in drucklosen hochtemperatur—waemauebertragem." Chemietechnik, Aug. 1998, pp. 52,54,56, vol. 27 No. 8, Heidelberg.

* cited by examiner

Primary Examiner—Yogendra N. Gupta
Assistant Examiner—D. G. Hamlin
(74) Attorney, Agent, or Firm—Millen, White, Zelano, Branigan, P.C.

(57) ABSTRACT

The invention concerns a heat transfer fluid comprising a monobenzyl-1,2,3,4-tetrahydronaphthalene or a mixture of mono-and polybenzyl-1,2,3,4-tetrahydronaphthalene and/or a mixture of partly hydrogenated polyphenyls and at least a polyphenylmethane composition.

23 Claims, 8 Drawing Sheets

HEAT TRANSFER FLUID BASED ON POLYPHENYLMETHANES EXHIBITING IMPROVED THERMAL STABILITY

The present invention relates to heat transfer fluids based on polyphenylmethanes exhibiting improved thermal stability and more particularly to heat transfer fluids which can be used at high temperature, comprising at least one polyphenylmethane composition and at least one mixture of isomers of benzyl-1,2,3,4-tetrahydronaphthalenes and/or one partially hydrogenated polyphenyl composition.

Heat transfer fluids are widely used in order to ensure strict control of temperatures in chemical industry operations, and are required to possess a certain number of physicochemical characteristics.

Accordingly the heat transfer fluids which have to be used within a very broad temperature range, i.e., ranging from −30° C. to +400° C., are required to possess, as well as good heat transfer, a high boiling temperature at atmospheric pressure, good thermal stability, low viscosity over a wide temperature range, even at low temperature during—in particular—their employment, little tendency to corrode the materials of the apparatus, and low sensitivity to oxidation. They must also carry low risk to the environment in case of leakage, and also low fire risks.

Among all of these criteria, the thermal stability is a determinant criterion and is the concern of manufacturers and producers of heat transfer fluids.

The degradation of a heat transfer fluid is typically accompanied by the formation both of volatile products, which lower the flash point of the heat transfer fluid, and of heavy products, which increase the viscosity and thereby lower the heat transfer coefficient.

Numerous publications propose products intended to meet all of the aforementioned criteria, but the range of products which can be used, especially at atmospheric pressure, within a temperature range from ambient to approximately 350° C. is limited.

In the article by COMMANDEUR et al. titled "Une nouvelle famille de fluides thermiques hautes performances [A new class of high-performance thermal fluids]" (Inf. Chimie no. 376, 1996, pages 93–96) and in KIRK-OTHMER Encyclopedia of Chemical technology—4th edition, vol. 12, pages 993 to 1006, a list may be found of the major commercially available heat transfer fluids.

By way of illustration of such products, mention is made in particular of the mixtures of isomers of dibenzyltoluene, partially hydrogenated terphenyls, benzene alkylates, and mixtures of biphenyl, and diphenyl ether.

Furukawa Y. et al. describe, in patent application JP 74 105 781 published Oct. 7, 1974, hear transfer fluids consisting essentially of compounds of formula:

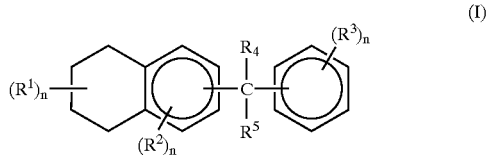

(I)

in which $R^1$, $R^2$, $R^3$, $R^4$, and $R^5$ is selected from the hydrogen atom and a lower alkyl radical such as $CH_3$, and n is 1 or 2.

The thermal stability of these products has been evaluated under nitrogen pressure at temperatures of at most 340° C.

For instance, 1-phenyl-1-(5,6,7,8-tetrahydro-2-naphthyl) ethane (formula (I) in which $R^1=R^2=R^3=R^4=H$, $R^5=CH_3$, n=1) was tested at 340° C. under a nitrogen pressure of 15 kg/cm² for 14 days and does not exhibit any significant change in flash point, in its viscosity, or in its color.

In international patent application WO98/50483, a mixture of 1,2,3,4-tetrahydro-5-(1,phenylethyl)naphthalene and 1,2,3,4-tetrahydro-6-(1-phenylethyl)naphthalene, which is sold by Dow Chemical Company under the designation Dowtherm RP, was combined with other heat transfer fluids for the purpose of enhancing their thermal stability.

The applicant has now found heat transfer fluids of improved thermal stability, based on polyphenylmethanes, which can be used at high temperatures, at most 370° C. and preferably between 320° C. and 360° C., under pressures greater than or equal to atmospheric pressure, which meet all of the aforementioned criteria.

The invention accordingly provides a heat transfer fluid which can be used at temperatures of at most 370° C. and, preferably, of between 320° C. and 360° C., characterized in that it comprises at least one mixture of isomers of formula:

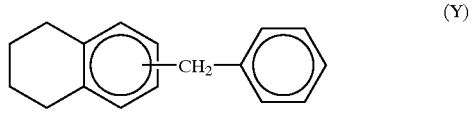

(Y)

and/or a mixture of partially hydrogenated polyphenyls, and at least one polyphenylmethane composition selected from:

compositions (I) comprising a mixture of products of formula (A):

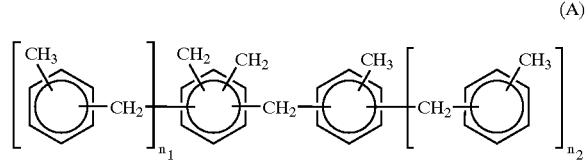

(A)

in which $n_1$ and $n_2=0$ or 1 and which comprises products (A) such that $n_1+n_2=0$ and products (A) such that $n_1+n_2=1$, and of products of formula (B):

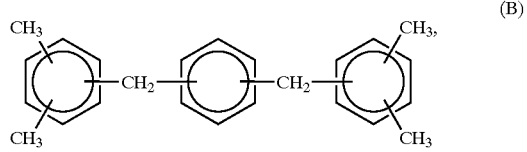

(B)

compositions (II) comprising a mixture of two products (C) and (D), in which:

the product (C) is a mixture of isomers of formula:

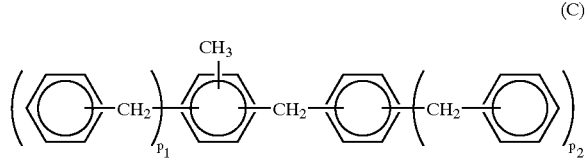

(C)

where $p_1$ and $p_2=0.1$ and 2, with the proviso that $p_1+p_2 \leq 3$, and the product (D) is a mixture of isomers of formula:

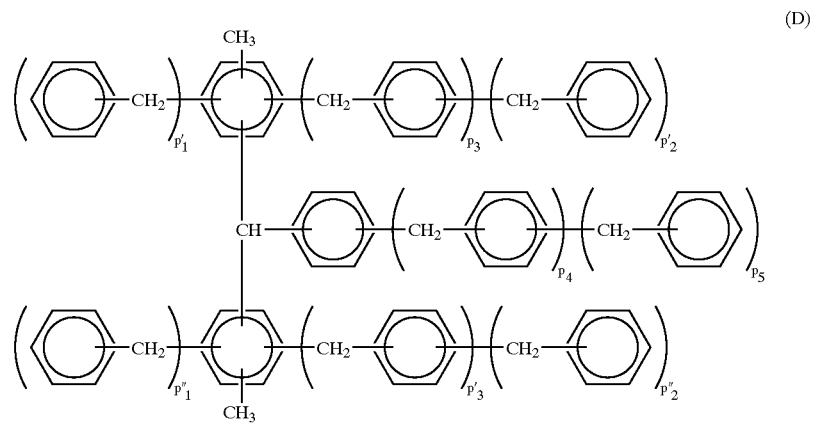

(D)

where $p'_1$, $p''_1$, and $p_4 = 0.1$ and $2$
$p'_2$, $p''_2$, $p_3$, and $p_5 = 0$ and $1$
with the proviso that $p'_1 + p''_1 + p'_2 + p''_2 + p_3 + p'_3 + p_4 + p_5 \leq 2$.

compositions (III) comprising a mixture of two products (A1) and (A2) such that:
the product (A1) is a mixture of isomers of formula:

(A1)

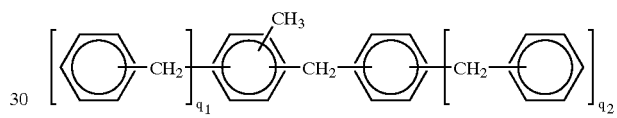

where $m_1$ and $m_2 = 0$, $1$ or $2$, with the proviso that $m_1 + m_2 \leq 3$, the product (A2) is a mixture of isomers of formula:

(A2)

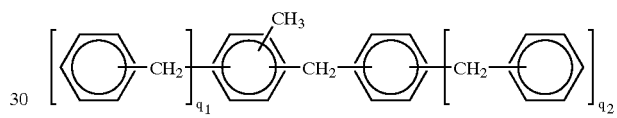

where $q_1$ and $q_2 = 0$, $1$ or $2$, with the proviso that $q_1 + q_2 \leq 3$,
and in that at least one of the compounds (A1) and (A2) comprises an isomer having three benzene nuclei.

compositions (IV) comprising the two products (A1) and (A2) and at least one compound selected from the following products (E1), (E2) or (E3):
(E1) is an isomer or a mixture of isomers of formula:

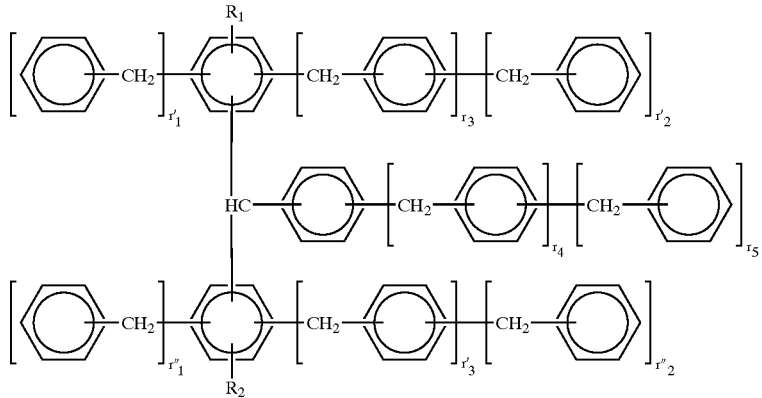

(E1)

where $r'_1$, $r''_1$, and $r_4$=0, 1 or 2,
$r'_2$, $r''_2$, $r_3$, $r'_3$, and $r_5$=0 and 1
with the proviso that $r'_1+r''_1+r'_2+r''_2+r''_3+r'_3+r_4+r_5$ is less than or equal to 2.

$R_1$ and $R_2$ represent a hydrogen atom.

(E2) is an isomer or a mixture of isomers of the same general formula as (E1) except that $R_1$ and $R_2$ represent a methyl and the indices r are replaced by s and have the same meaning.

(E3) is an isomer or a mixture of isomers of the same general formula as (E1) except that $R_1$ and $R_2$ are different and represent a hydrogen atom or a methyl radical and the indices r are replaced by t and have the same meaning.

According to the present invention, the compositions (I) may comprise product (A) having 2 nuclei, (methylbenzyl)xylene, and product (A) having 3 nuclei, which is designated bis(methylbenzyl)xylene. Said product (A) having 3 nuclei may be product such that $n_1$=1 and $n_2$=0, product such that $n_1$=0 and $n_2$=1, or a mixture of these two latter products. The polyarylalkane composition may also comprise products such that $n_1$=1 and $n_2$=1.

By way of illustration of compositions (I) which can be used in accordance with the present invention, mention is made of the polyphenylmethane composition sold by the company ELF ATOCHEM S.A. under the designation JARYTHERM AX 320, containing more than 99% of compounds having 2 and 3 aromatic nuclei.

By way of illustration of compositions (II) which can be used in accordance with the present invention, mention is made of the polyarylalkane composition sold by the company ELF ATOCHEM S.A. under the designation JARYTHERM BT 06 which comprises at least 70% by weight of a mixture of isomers of benzyltoluene (product (C), $p_1$=$p_2$=0), at least 20% by weight of isomers of dibenzyltoluene (product (C), $p_1$=1, $p_2$=0 or $p_1$=0 and $p_2$=1), and ditolylphenyl-methane (product (D), $p'_1+p''_1+p'_2+p''_2+p_3+p'_3+p_4+p_5$=0); the polyphenylmethane composition sold by the company ELF ATOCHEM S.A. under the designation JARYTHERM DBT, which consists essentially of from 95% to 98% by weight of isomers of dibenzyltoluene (product (C), p1+p2=1) and of from 2% to 5% by weight of ditolylphenylmethane.

These compositions may be obtained by processes described in patents EP 136 230-B1, EP 299 867-B1, EP 384 818-B1, EP 500 435-B1 which consist in chlorinating toluene or xylene and then carrying out a Friedel-Crafts-type condensation either on toluene or on xylene (isomer mixture) or else on a toluene and xylene mixture or else on benzene or else on a mixture of benzene and toluene. When the reaction is at an end, the unconverted reactant or reactants is or are eliminated directly by distillation and then the crude product may be subjected to a dechlorination treatment such as that described in patent EP 306 398-B1.

Accordingly, for example, the compositions (II) may be obtained by a process described in patent EP 136 230-B1, which consists in a first step of reacting chlorine with toluene by a radical reaction in the presence of a free-radical initiator at a temperature of between 50° C. and 110° C. and then, in a second step, the reaction product from the first step is subjected to a condensation reaction with toluene in the presence of $FeCl_3$ at a temperature of between 50° C. and 100° C.

The compositions (I) may be obtained by a process described in patent EP 0 50 435-B1, which consists in condensing (methyl)benzyl chloride with xylene in the presence of $FeCl_3$.

According to the present invention, the mixture of isomers of formula (Y) is preferably a mixture of 5-benzyl-1,2,3,4-tetrahydronaphthalene and 6-benzyl-1,2,3,4-tetrahydronaphthalene.

This isomer mixture may be obtained by reacting benzyl chloride with 1,2,3,4-tetrahydronaphthalene in the presence of a Friedel-Crafts-type catalyst such as $FeCl_3$.

The invention likewise provides a heat transfer fluid based on a mixture of isomers of formula (Y) and/or a mixture of partially hydrogenated polyphenyls and at least one polyphenylmethane composition selected from compositions (I), (II), (III) or (IV), characterized in that, in addition, (Y) is in a mixture with the following compounds (Y1) and (Y2):

(Y1) is a mixture of monobenzylation compounds of (Y), of formulae:

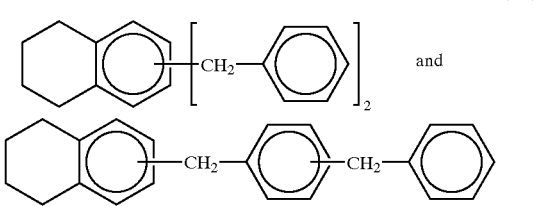

(Y1)

and (Y2) is a mixture of mono- or polybenzylation compounds of (Y1), of formulae

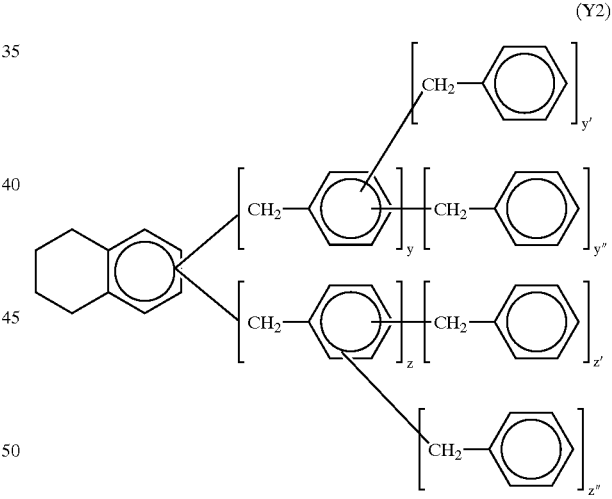

(Y2)

where y and z=0, 1 or 2; y', y", z', z"=0 or 1, with the proviso that y+z is never 0, that $y'+y''+z'+z'' \geq 1$, and that $y+z+y'+y''+z'+z'' \geq 3$.

According to the present invention, the compounds (Y), (Y1) and (Y2) in the mixture (Y)+(Y1)+(Y2) are in the following proportions by weight:

compounds of formula (Y)—between 60% and 90%,
compounds of formula (Y1)—between 9% and 35%,
compounds of formula (Y2)—between 0.1% and 10%.

The mixture of isomers of formula (Y) and also the mixture of isomers of formula (Y) and compounds (Y1) and (Y2) may be obtained by a process which consists in reacting benzyl chloride with a molar excess of 1,2,3,4- tetrahydronaphthalene (tetralin) in the presence of an inorganic halide or else of a protic acid.

This reaction takes place in practice at a temperature of between 30° C. and 150° C. and preferably between 50° C. and 100° C.

Among inorganic halides use may be made of ferric chloride, antimony trichloride, titanium tetrachloride or else aluminum chloride at levels by weight relative to the reactants employed of customarily between 50 ppm and 1% and preferably between 100 ppm and 0.5%. Preference is given to using ferric chloride. Protic acids may likewise be used: sulfuric acid, for example, at a concentration by weight of between 70 and 95%. It is also possible to employ zeolites or else certain inorganic oxides.

Following distillation of the excess tetralin, the inorganic halide or the protic acid is removed by any known technique such as: washing with water then drying where aprotic acid is used, treatment with sodium methoxide as described in patent EP 306 398 B1 where an inorganic halide is used The product thus treated is subjected either to flash evaporation in order to remove traces of impurities originating either from the raw materials or from the process, or of accidental origin, plus any catalyst residues; or to fractional distillation to give fractions comprising compounds (Y), (Y1) and/or (Y2). These fractions can be used to prepare compositions comprising well-defined amounts of compounds (Y), (Y1), and (Y2).

The characterization of the compounds (Y), (Y1), and (Y2) and their amounts in the various distillation fractions may be carried out by GC analysis followed by proton NMR analysis in a $CCl_4$ medium using tetramethylsilane as standard.

It would not be departing from the scope of the invention to use, instead of tetralin, a mixture of napthalene compounds hydrogenated to a greater or lesser extent. These mixtures generally comprise from 80% 90% by weight of tetralin, the remainder to 100% consisting of variable amounts of decalin and unconverted naphthalene.

The partially hydrogenated polyphenyls which can be used in accordance with the present invention are partially hydrogenated biphenyls such as phenylcyclohexane or else complex 80/20 mixtures of terphenyls (ortho, meta, and para isomers) and of quaterphenyls hydrogenated to a greater or lesser extent. They are available commercially.

As far as the polyphenylmethane compositions are concerned, preference is given to using the compositions of formulae (I) or (II).

The heat transfer fluid of the present invention may be obtained simply by mixing the products. It is also possible to envisage preparing this mixture by reacting benzyl chloride with toluene (or benzyltoluene) and tetralin.

The transfer fluid of the present invention comprises at least 50% by weight and preferably at least 75% by weight of at least one composition of polyphenylmethanes (I), (II), (III) or (IV).

The remainder by weight to 100% may comprise a mixture of isomers of formula (Y) or a mixture of products of formula (Y), (Y1), and (Y2) or else partially hydrogenated polyphenyls or else a mixture of isomers of formula (Y) or the mixture of products of formulae (Y), (Y1), and (Y2) with partially hydrogenated polyphenyls.

The heat transfer fluids of the present invention, which consist of mixtures comprising a mixture of isomers of formula (Y) or a mixture of the compounds of formulae (Y), (Y1), and (Y2) and/or partially hydrogenated polyphenyls with compositions of polyphenylmethanes (I), (II) (III) or (IV) exhibit the advantage of having a greater thermal stability than the polyphenylmethane compositions used alone.

The examples which follow illustrate the invention.

EXAMPLES

1. Heat Transfer Fluids Used

JARYTHERM DBT, denoted by DBT hereinbelow; sold by the company ELF ATOCHEM S.A. DBT consists essentially of from 95% to 98% by weight of isomers of dibenzyltoluene [product (C) with p1+p2=1] and from 2 to 5% of ditolylphenylmethane and has a boiling point at atmospheric pressure of 390° C.

JARYTHERM BT06, denoted by BT06 hereinbelow; sold by the company ELF ATOCHEM S.A. Its constitution has been described above.

JARYTHERM AX320, denoted by AX320 hereinbelow; sold by the company ELF ATOCHEM S.A. AX320 contains >99% by weight of aromatics having 2 and 3 nuclei.

DOWTHERM RP, denoted by RP hereinbelow; sold by the company DOW CHEMICAL Co. DOWTHERM RP is a mixture of isomers of 1,2,3,4-tetrahydro-5-(1-phenylethyl) naphthalene and 1,2,3,4-tetrahydro-6-(1-phenylethyl)naphthalene which has a boiling point at atmospheric pressure of 354° C. THERMINOL 66, denoted by HT hereinbelow; sold by the company MONSANTO. THERMINOL 66 is a mixture of partially hydrogenated terphenyls which has a boiling point at atmospheric pressure of 359° C.

2. Preparation of the Isomer Mixture of 5-Benzyl-1,2,3,4-Tetrahydronaphthalene and 6-Benzyl-1,2,3,4-Tetrahydronaphthalene, Denoted by BTHN Hereinbelow, and of a Mixture Comprising the Compounds of Formula (Y), (Y1), and (Y2), Denoted by PBTHN A 10 l reactor equipped with a rotary stirrer, an ascending condenser, a nitrogen injector, a thermometer sheath, a dropping funnel, and heating means is charged with 5404 g of 1,2,3,4-tetrahydro-naphthalene with a purity of 98.5%, corresponding to 40.94 moles. The product is heated to 120° C. with nitrogen blanketing and stirring.

The outlet of the condenser is subsequently connected to a water bubbler.

6.7 g of anhydrous $FeCl_3$ are added to the reactor followed by the introduction, still with nitrogen blanketing, of 1295.4 g of benzyl chloride with a purity of 99%, corresponding to 10.24 moles over 3 hours 30 minutes. The 1,2,3,4-tetrahydro-naphthalene/benzyl chloride molar ratio is 4.

At the end of the introduction of benzyl chloride, it is found that the amount of HCl given off and trapped in the bubbler is 9.14 moles.

The amount by weight of benzyl chloride present in the reaction mixture is 0.74%.

The reaction is continued, with stirring and nitrogen blanketing, at 120° C. for 1 hour and then at 130° C. for 1 hours.

The total amount of HCl given off and trapped in the bubbler is 10.2 hours.

The final amount of benzyl chloride in the reaction mixture is approximately 0.2% by weight. After cooling to ambient temperature and with nitrogen blanketing, the contents of the reactor (6325 g) are subsequently placed in a 10 l round-bottomed distillation flask atop which there is mounted an adiabatic column 50 cm high which is packed with glass spirals (column efficiency equal to approximately 3 theoretical plates) and surmounted by a single distillation head and a condenser.

Unconverted 1,2,3,4-tetrahydronaphthalene is recovered by distillation under a pressure of 40 mm of mercury.

Distillation is carried out for 4 hours at a bottom temperature ranging from 130° C. to 239° C. and an overhead temperature ranging from 115° C. to 118° C. for the majority of the distillation, with an increase to 142° C. at the end of distillation.

4200 g of a colorless liquid are recovered which has a 1,2,3,4-tetrahydronaphthalene content of more than 98.5% and can be recycled to a subsequent operation.

The distillation bottoms (2105 g), containing less than 0.14% by weight of 1,2,3,4-tetrahydronaphthalene, are subsequently subjected to an operation to remove small amounts of residual organic chlorine, an operation which consists in treating said distillation bottoms with approximately 21 g of powdered $CH_3ONa$ (1% by weight relative to the weight of product to be treated) in a reactor, with stirring and with nitrogen blanketing, at 300° C. for 3 hours.

The product thus treated is subjected to fractional distillation in the distillation apparatus used before.

A fraction of 1400 g is recovered of a product having a boiling temperature of 218/220° C. under a pressure of 18 mm of mercury, which consists of more than 98.8% by weight of a mixture of 6-benzyl-1,2,3,4-tetrahydronaphthalene (65% by weight) and of 5-benzyl,1,2,3,4-tetrahydronaphthalene (35% by weight), denoted by BTHN hereinafter.

This is a colorless liquid having a boiling point at atmospheric pressure of 353° C., a viscosity at 20° C.=21 $mm^2/s$, and a chlorine content=1 ppm.

The distillation is continued, with the column packing being removed and the pressure being lowered to 12 mm of mercury.

Various fractions are recovered which have weight contents (%) of mono-, di-, and tribenzyl-1,2,3,4-tetrahydronaphthalenes as reported in table 1 below:

TABLE 1

| Fraction | Weight (g) | Boiling temp. (° C.) | Pressure (mmHg) | BTHN (%) | DBTHN (%) | TBTHN (%) |
| --- | --- | --- | --- | --- | --- | --- |
| 1 | 13.5 | 220–290 | 12 | 20.37 | 66.3 | 1.3 |
| 2 | 440 | 290–305 | 12 | 0.44 | 92.2 | 5.2 |
| 3 | 69 | 305–330 | 12 | 0.35 | 45.7 | 53.5 |
| 4 | 14 | 330–344 | 12 | 0.7 | 4 | 93.3 |

In this table 1:

BTHN denotes monobenzyl-1,2,3,4-tetrahydro-naphthalene (formula (Y)) which is a mixture of 6-benzyl-1,2,3,4-tetrahydronaphthalene (65% by weight) and of 5-benzyl-1,2,3,4-tetrahydronaphthalene (35% by weight).

DBTHN denotes the compounds of formula (Y1).

TBTHN denotes the compounds of formula (Y2) in which $y+z+y'+y''+z'+z''=3$.

Mixing 83 parts by weight of BTHN and 21 parts by weight of fraction 2 gives a mixture denoted by PBTHN which comprises approximately 80% by weight of BTHN, 19% by weight of compounds of formula Y1, and 1% by weight of formula Y2 in which $y+z+y'+y''+z'+z''=3$).

This mixture—PBTHN—has a boiling point at atmospheric pressure of 359° C. and a viscosity at 20° C. of 38 $mm^2/s$.

3. Preparation of Mixtures of Heat Transfer Fluids

The mixtures of heat transfer fluids were produced by simple mixing, at ambient temperature, of the abovementioned heat transfer fluids in a stirred glass reactor.

These mixtures are stirred until a homogeneous mixture is obtained.

On each mixture obtained, the viscosity at 20° C. is determined using a tube visonimeter.

The following mixtures were produced:

| Mixture | Constituents (% by weight) |
| --- | --- |
| 1-NC | DBT 75%, RP 25% |
| 2-C | DBT 75%, BTHN 25% |
| 3-C | DBT 75%, TH 25% |
| 4-C | DBT 80%, TH 20% |
| 5-C | DBT 75%, PBTHN 25% |
| 6-C | BT06 75%, BTHN 25% |
| 7-C | AX320 75% BTHN 25% |

NC means not in accordance with the invention (comparative), C denotes in accordance with the invention.

4. Apparatus for Evaluating the Thermal Stability of the Heat Transfer Fluids, and Procedure A 1.6 l stainless steel reactor is used, equipped with a stirrer, a temperature probe and an outlet connected to a Dean-Starck apparatus equipped with an ascending condenser, which is linked to a graduated water vessel.

The reactor is fitted with a regulated heating jacket.

The evaluation of the thermal stability of the heat transfer fluid or of a mixture of heat transfer fluids is carried out on 1 kg of said heat transfer fluid or said mixture of heat transfer fluid and consists in introducing the product to be evaluated into the reactor, closing the reactor, carrying out blanketing with at least one inert gas, and raising it to the temperature of the test for a specific time.

Condensates are recovered (at the bottom of the Dean-Starck apparatus) and their amounts are determined as a function of time.

The volume of gas is determined from the graduated water vessel.

At the end of the test, the viscosity of the contents of the reactor is also effected 5. Tests 5.1. Comparative Evaluation of the Thermal Stability of:
5a—DBT alone (control test),
5b—mixture 1NC (DBT/RP—75/25),
5c—mixture 2C (DBT/BTHN—75/25)

heated at 360° C. for 500 hours.

In each test, 1 kg of product is used which is heated to 360° C. under atmospheric pressure for 500 hours.

The results are reported in FIGS. 1 and 2.

Figure 1:
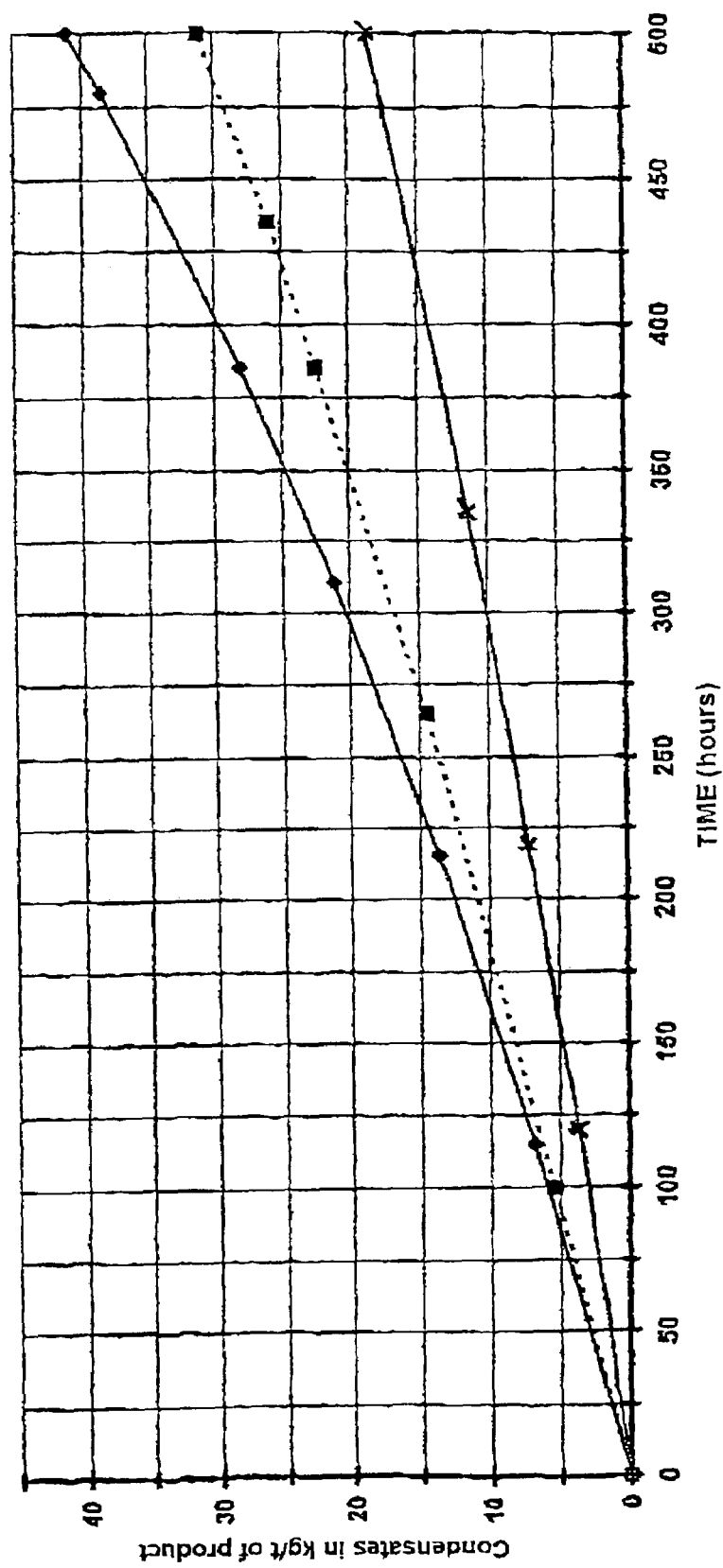
FIG. 1 represents the amount of condensates in kg/t of product as a function of the time in hours at 360° C. The condensates consist primarily of toluene, xylenes, and ethylbenzene.
Figure 2:
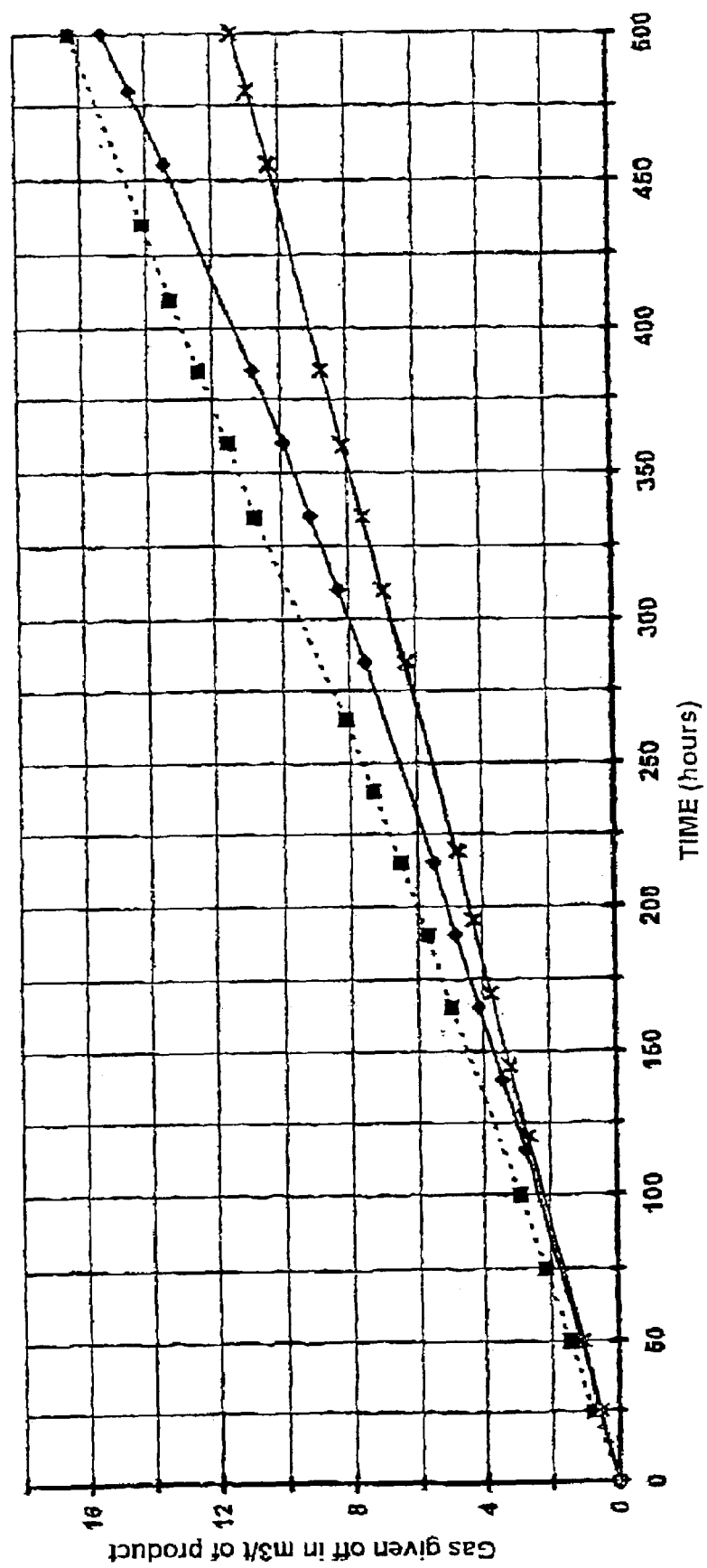
FIG. 2 represents the amount of gas given off in m3/t of product as a function of the time in hours at 360° C. The uncondensable gaseous products consist primarily of $CH_4$, $H_2$ and small amounts of light hydrocarbons.

In these FIGS. 1 and 2:
—♦— represents DDT,
---■--- represents the mixture 1NC,
—x— represents the mixture 2C.

Figure 3:
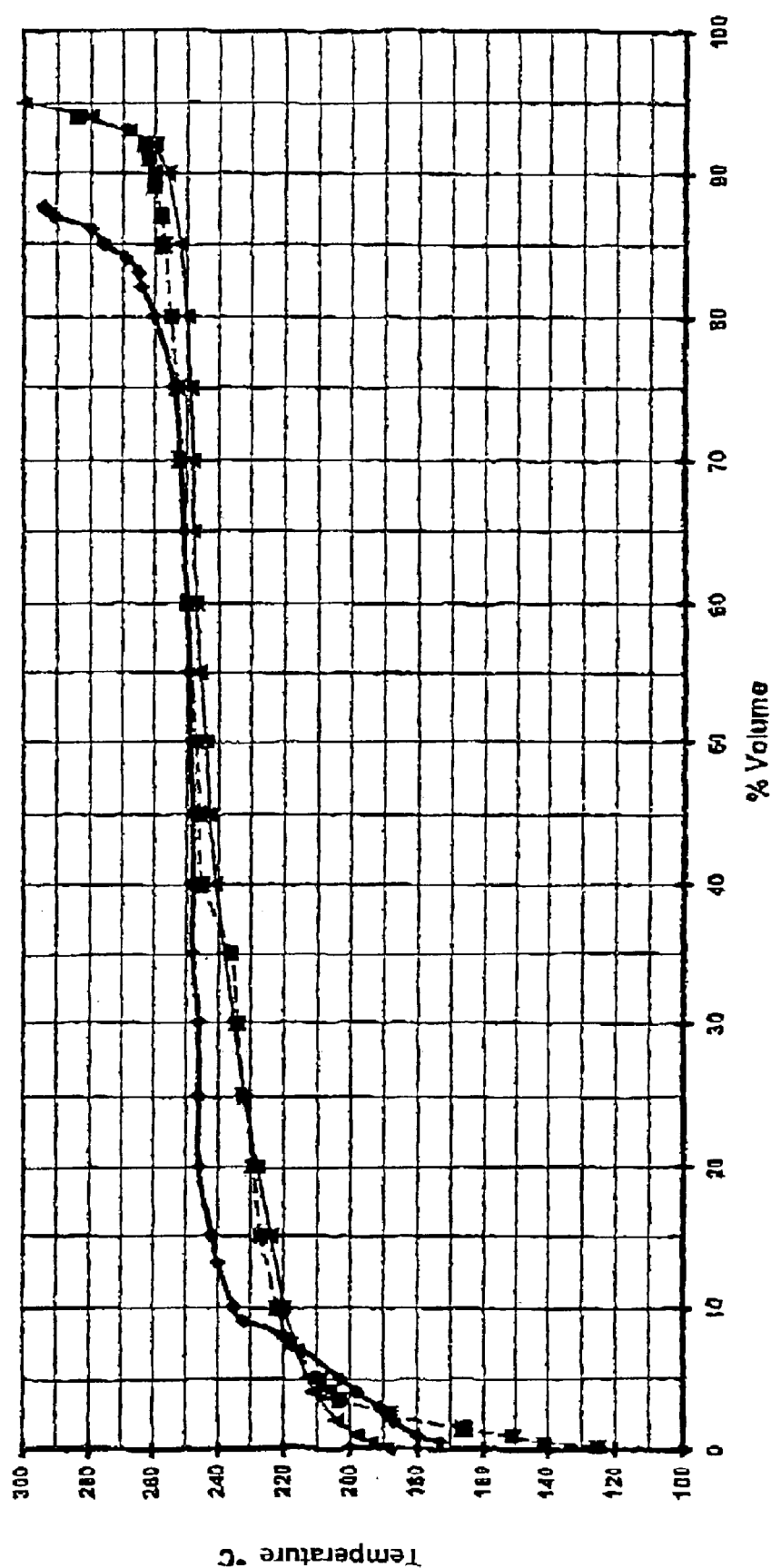

FIG. 3 represents the curves of simple distillation under a pressure of 20 mm of Hg of the products having undergone the thermal stability evaluation test.

In this FIG. 3:
—♦— represents the distillation curve of DBT after 500 hours at 360° C.,
---■--- represents the distillation curve of the mixture 1NC after 500 hours at 360° C.,
—▲— represents the distillation curve of the mixture 2C after 500 hours at 360° C.

It can be seen that the amount of disputation products containing 2 rings and greater than or equal to 4 rings is minimum with BTHN, intermediate with RP, and maximum with DBT.

Table 2 below reports the initial viscosities and the viscosities after 500 hours at 360° C.

TABLE 2

| Heat transfer fluids | Viscosity at 20° C. (mm²/s) | |
|---|---|---|
| | initial | after 500 h at 360° C. |
| DBT | 53 | 104 |
| RP | 45 | — |
| BTHN | 21 | — |
| 1NC | 50 | 57 |
| 2C | 42 | 47 |

Table 3 reports the percentage by weight (%) of anthracene, determined by GC, present in the heat transfer fluids after 500 hours at 300° C. Anthracene is a "marker" for the decomposition of DBT.

We have also reported in this table 3 the color of the products after 500 hours at 300° C.

TABLE 3

| Tests | Anthracene (%) | Color |
|---|---|---|
| 5a | 1.46 | very dark brown |
| 5b | 0.28 | dark orange |
| 5c | 0.19 | light orange |

5.2. Comparative Evaluation of the Thermal Stability of:
  5a—DBT alone (control test),
  5d—mixture 3C (DBT/HT; 75/25)

heated at 360° C. for 5 hours.
  Evaluation is made as in tests 5.1.
  The results are reported in FIGS. 4 and 5.

Figure 4:
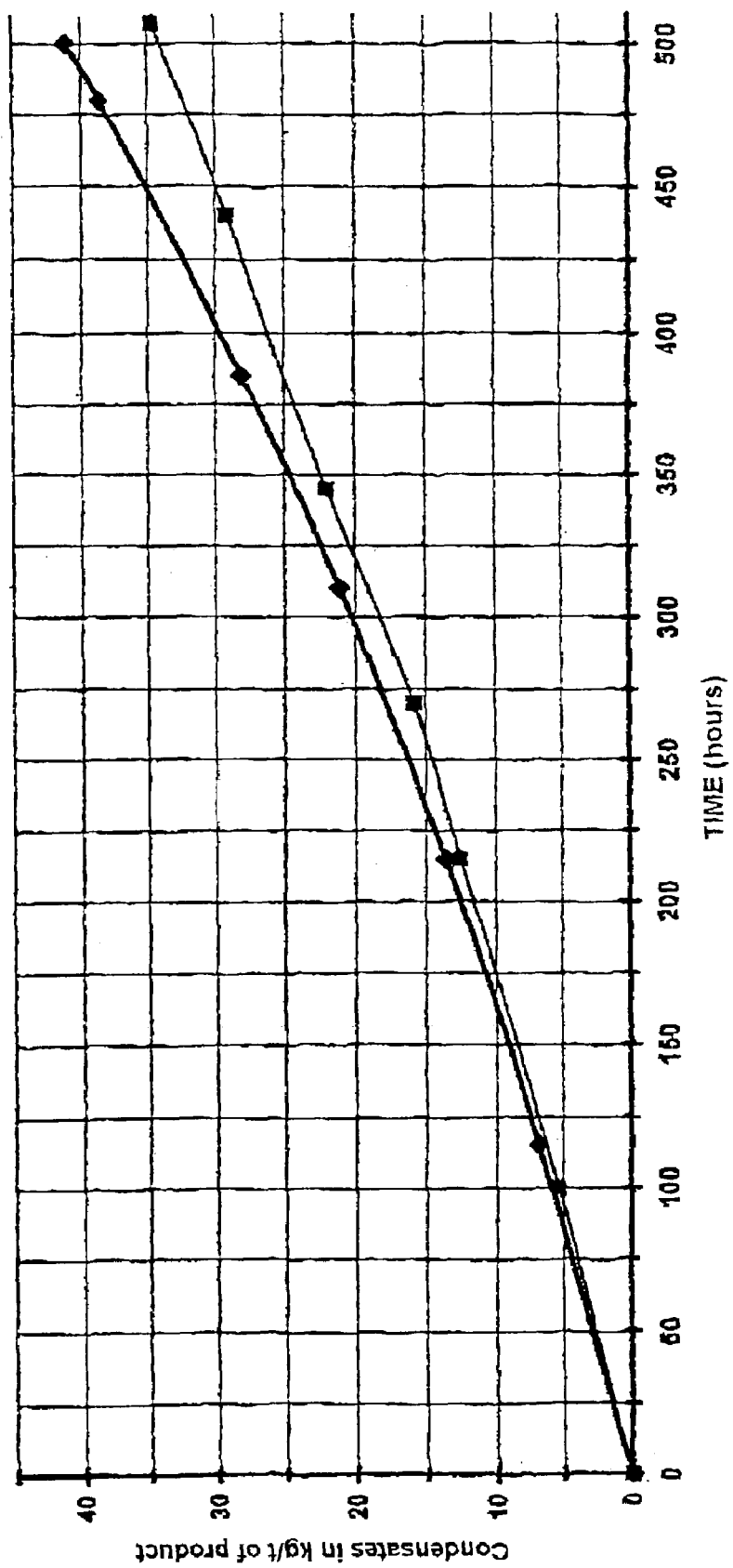

FIG. 4 represents the amount of condensates in kg/t as a function of the time in hours at 360° C.

Figure 5:
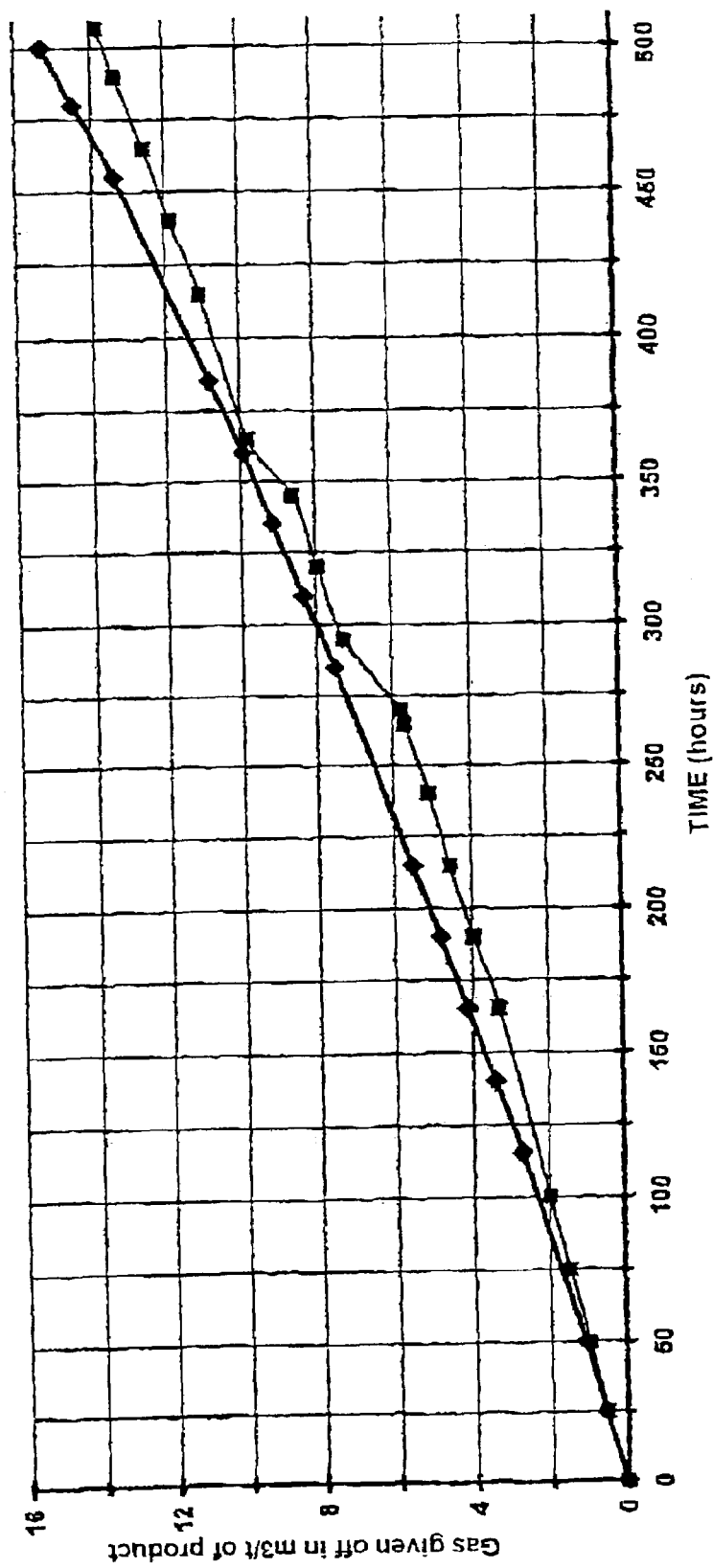

FIG. 5 represents the amount of gas given off in m3/t as a function of time in hours at 360° C.

In these FIGS. 4 and 5:
—♦— represents DBT,
—■— represents the mixture 3C.

Table 4 reports the color of the heat transfer fluids, their viscosities at 20° C. (mm²/s) and their percentages by weight (%) of anthracene after 500 hours at 360° C.

TABLE 4

| | | Viscosity (mm²/s) | | |
|---|---|---|---|---|
| Tests | Color | initial | after 500 h at 360° C. | Anthracene (%) |
| 5a | very dark brown | 53 | 104 | 1.46 |
| 5d | dark brown | 57.3 | 76.5 | 0.74 |

5.3. Comparative Evaluation of the Thermal Stability of:
  5a—DBT alone,
  5f—mixture 5C (DBT/PBTHN, 75/25). heated at 360° C. for 493 hours.

The evaluation is made as in the tests 5.1.

Figure 6:
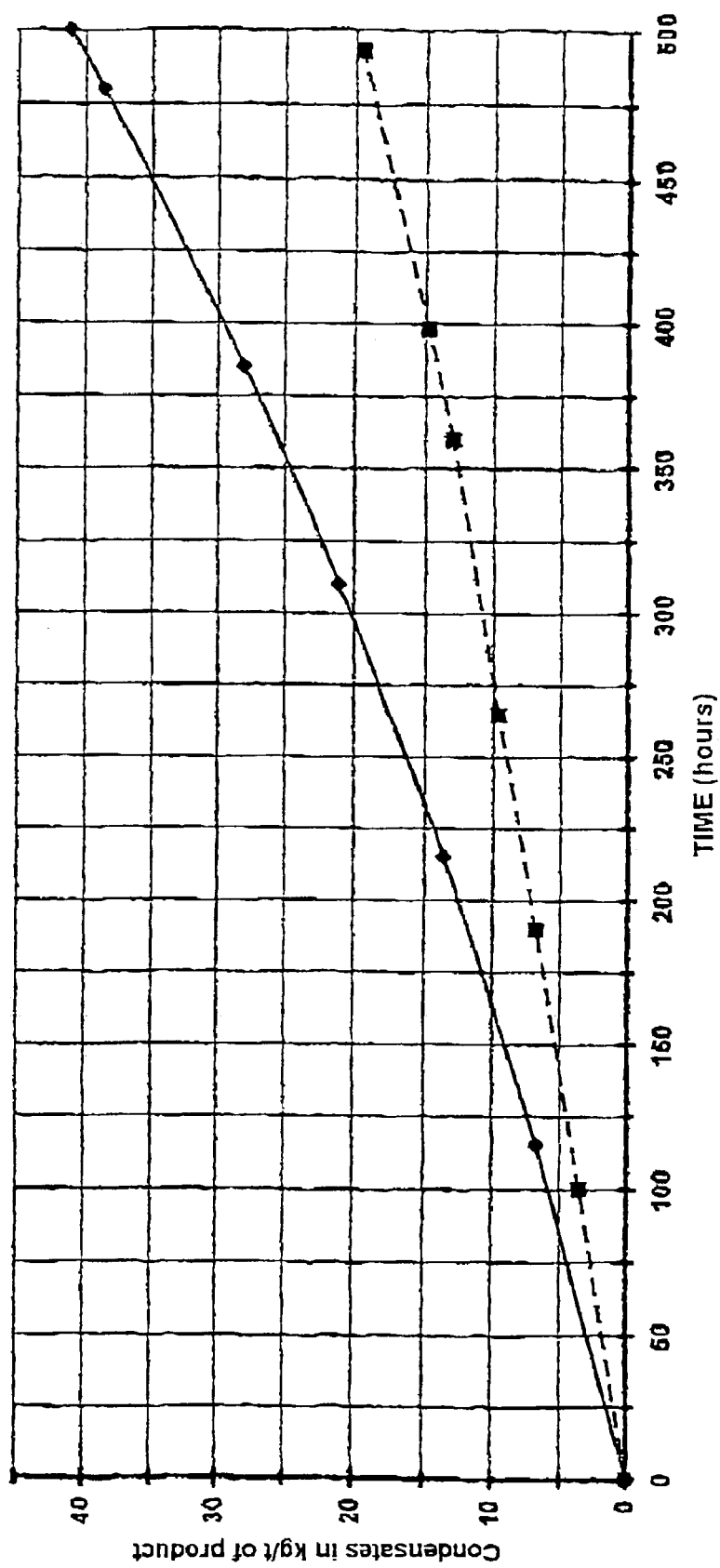
Figure 7:
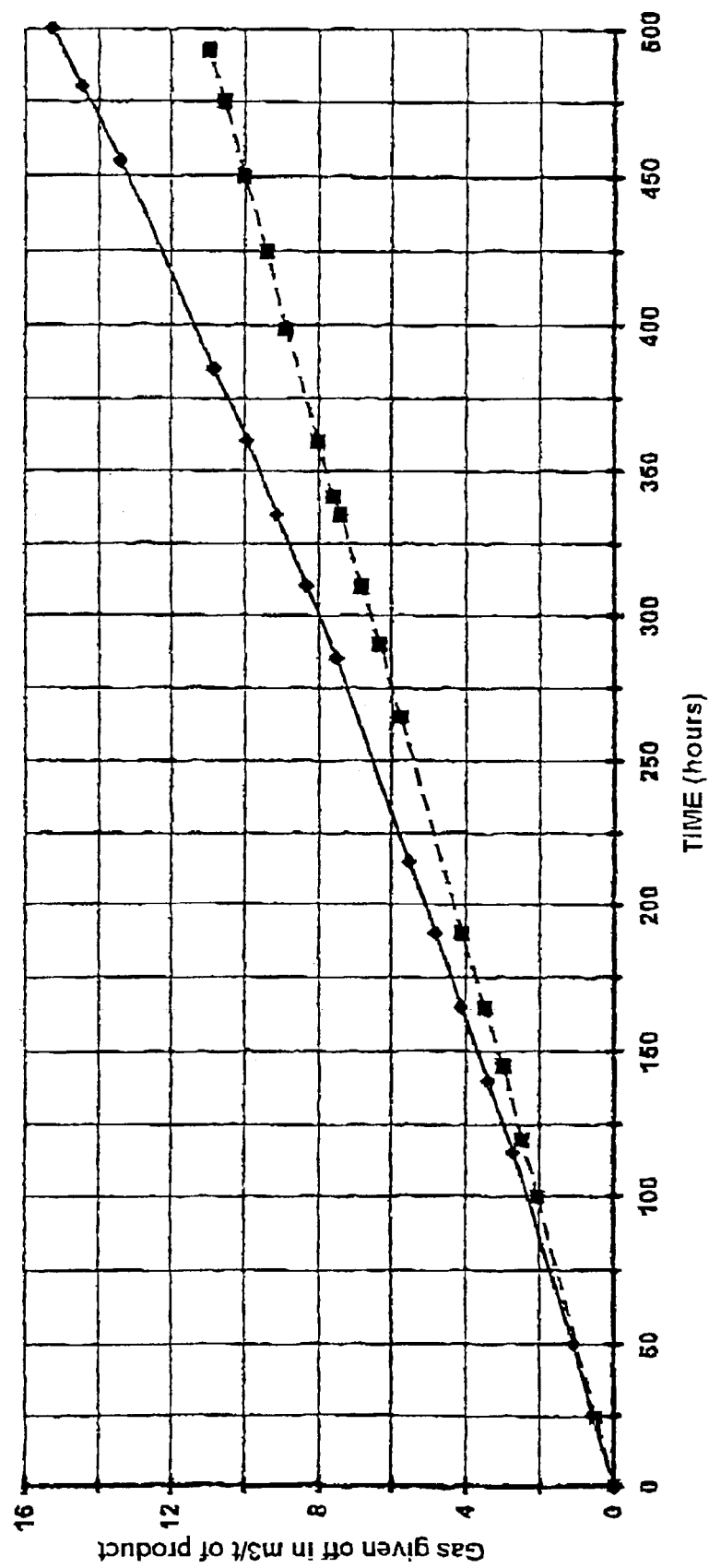

The results are entered in FIGS. 6 and 7.

FIG. 6 represents the amount of condensates in kg/t as a function of the time in hours at 360° C.

FIG. 7 represents the amount of gas given off in m3/t as a function of the time in hours at 360° C.

In these FIGS. 6 and 7:
—♦— represents DBT (5a),
---■--- represents the mixture 5C (5f).

Figure 8:
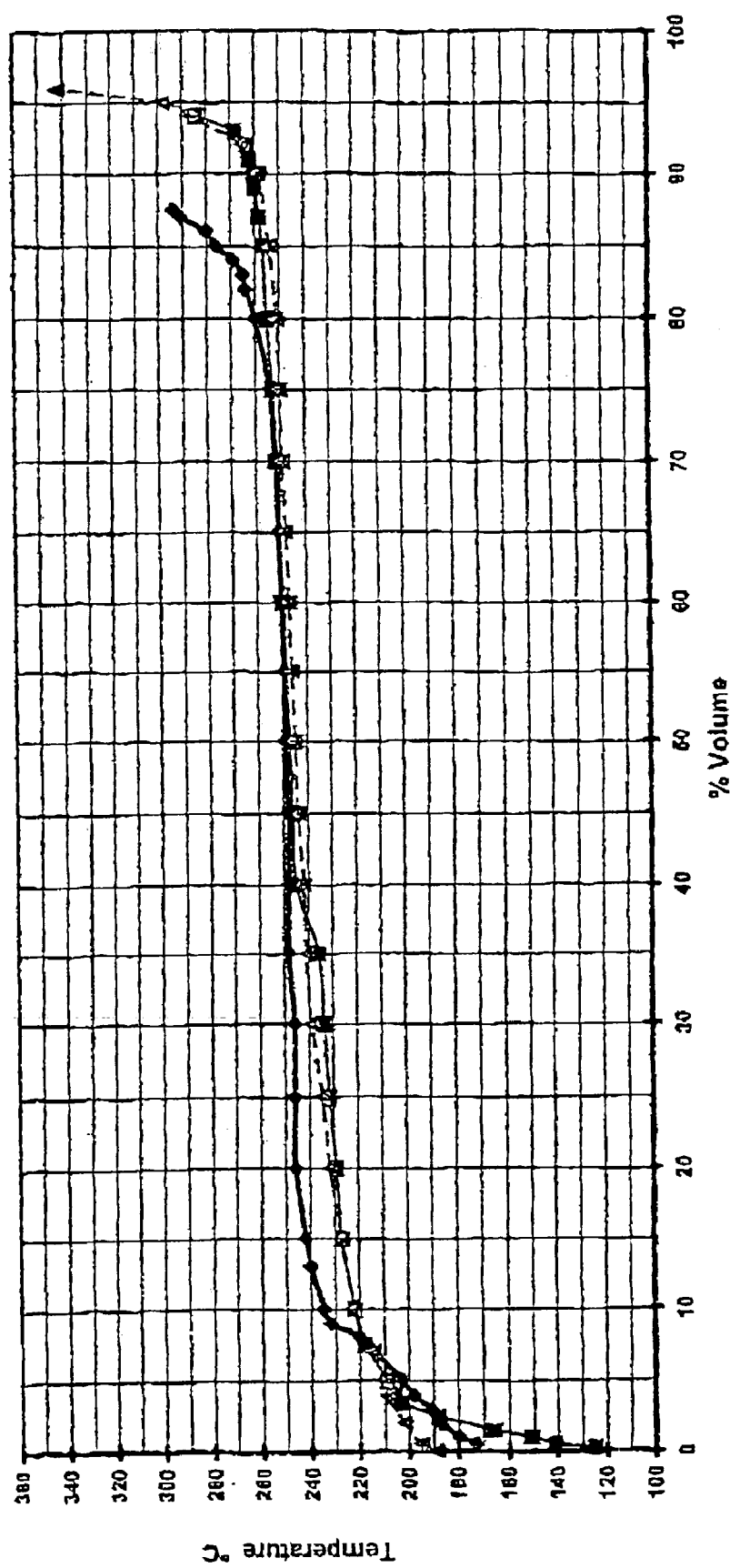

FIG. 8 represents the curves of simple distillation under a pressure of 20 mmHg of the products having undergone the thermal evaluation test.

These curves show that the amount of light products and of heavy products is lower than for DBT alone and than for DBT-RP (mixture 1NC).

In this FIG. 8:
—♦— represents the distillation curve of DBT after 500 hours at 360° C.,
—■— represents the distillation curve of the mixture 1NC after 500 hours at 360° C.,
—▲— represents the distillation curve of the mixture 5C after 493 hours at 360° C.

Table 5 reports the viscosities at 20° C. (in mm²/s) and the percentages by weight (%) of anthracene after 493 hours at 360° C.

TABLE 5

| | Viscosity (mm²/s) | | |
|---|---|---|---|
| Tests | initial | after 493 h at 360° C. | Anthracene (%) |
| 5a | 54 | 104 (after 500 h) | 1.46 |
| 5f | 47 | 58 | 0.13 |

6. Comparative Evaluation of the Thermal Stability of

1/ 6a BT06 alone,
6b mixture 6C (BT06/BTHN; 75/25),
2/ 7a AX320 alone,
7b mixture 7C (AX320/BTHN; 75/25)

The tests were carried out at 370° C. for 160 hours in a 200 ml stainless steel autoclave equipped with a thermometer sheath and a manometer. 50 g of heat transfer fluid to be tested are introduced, blanketing with nitrogen is carried out, and then the autoclave is closed and is subsequently placed in an electrically heated sand bath. Regulation makes it possible to hold the temperature of the heat transfer fluids constant at 370° C.

The results are reported in table 6.

TABLE 6

| Tests Parameters | 6a | 6b | 7a | 7b |
|---|---|---|---|---|
| Pressure at end of tests: (in bars) | | | | |
| at 370° C. | 5.8 | 6.2 | 13 | 11 |
| at 200° C. | 2 | 2.5 | 6.3 | 5.3 |
| Appearance of the product at end of test | Clear yellow | Clear light yellow | Dark orange with marked presence of insolubles at 20° C. (after filtration) | Light orange with slight presence of insolubles at 20° C. (after filtration) |
| Viscosity (in mm²/s) | | | | |
| initial | 6.2 | 8 | 23.5 | 23 |
| at end of test | 6.2 | 7.7 | 21 | 20 |
| GC analysis (% by weight) | | | | |
| 1-ring compound | 0 → 2.01 | 0 → 1.19 | 0 → 3.28 | 0 → 2.4 |
| compounds with >3 rings | 0.58 → 1.82 | 0.52 → 0.88 | 0.12 → 3.32 | 0.05 → 1.75 |
| anthracene | 0 → 0.93 | 0 → 0.22 | — | — |
| 2,3-dimethylanthracene | — | — | 0 → 1.61 including 1% insoluble at 20° C. | 0 → 0.72 including 0.1% insoluble at 20° C. |

In this table, 1-ring compounds are light aromatic compounds such as toluene, xylenes, and ethylbenzene, and compounds >3 rings are products.

The appearance, the formation of 1-ring compounds, heavy compounds and anthracene for tests 6a/6b, like the appearance, the formation of 1-ring compounds, heavy compounds, and of 2,3-dimethylanthracene and the pressure for tests 7a/7b, demonstrate the positive effect of BTHN on the thermal stability of BT06 and of AX320 respectively.

The invention claimed is:
1. A heat transfer fluid comprising:
(a) at least one mixture of isomers of formula:

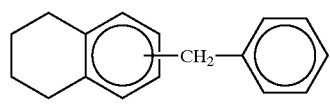

(Y)

and
(b) at least one polyphenylmethane composition selected from:
compositions (I) comprising a mixture of products of formula (A):

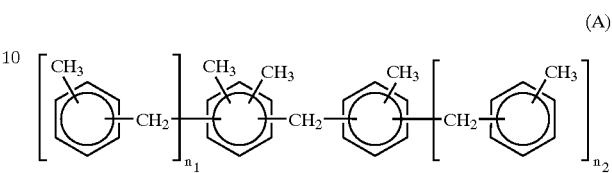

(A)

in which $n_1$ and $n_2$=0 or 1 and which comprises products (A) wherein $n_1+n_2$=0 and products (A) wherein $n_1+n_2$=1, and of products of formula (B):

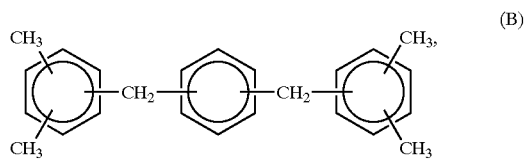

(B)

compositions (II) comprising a mixture of two products (C) and (D), in which:
the product (C) is a mixture of isomers of formula:

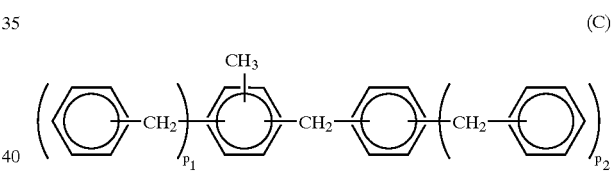

(C)

where $p_1$ and $p_2$=0.1 and 2, with the proviso that $p_1+p_2 \leq 3$, and
the product (D) is a mixture of isomers of formula:

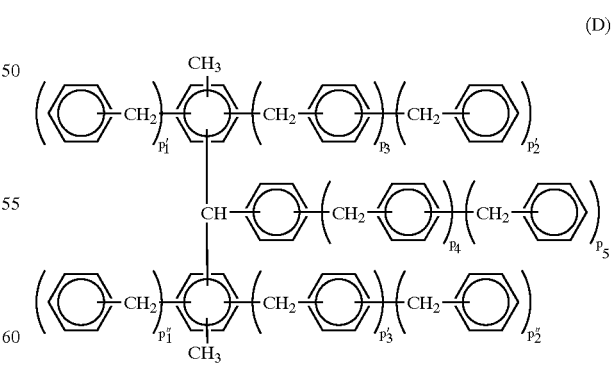

(D)

where $p'_1$, $p''_1$, and $p_4$=0.1 and 2
$p'_2$, $p''_2$, $p_3$, and $p_5$=0 and 1
with the proviso that $p'_1+p''_1+p'_2+p''_2+p_3+p'_3+p_4+p_5 \leq 2$;

compositions (III) comprising a mixture of two products (A1) and (A2) wherein:
the product (A1) is a mixture of isomers of formula:

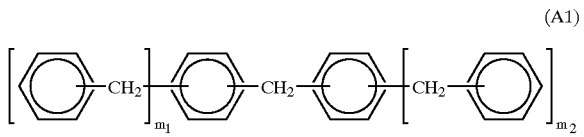

(A1)

where $m_1$ and $m_2$=0, 1 or 2, with the proviso that $m1+m_2 \leq 3$,
the product (A2) is a mixture of isomers of formula:

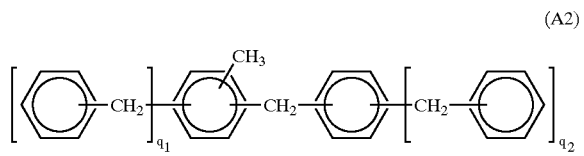

(A2)

where $q_1$ and $q_2$=0, 1 or 2, with the proviso that $q_1+q_2 \leq 3$,
and in that at least one of the compounds (A1) and (A2) comprises an isomer having three benzene nuclei; and compositions (IV) comprising the two products (A1) and (A2) and at least one compound selected from the following products (E1), (E2) or (E3):
(E1) is an isomer or a mixture of isomers of formula:

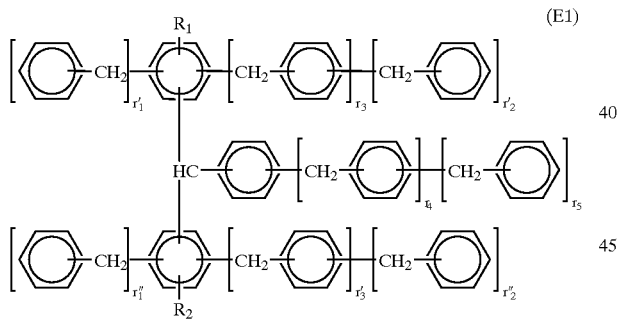

(E1)

where $r'_1$, $r''_1$, and $r_4$=0, 1 or 2,
$r'_2$, $r''_2$, $r_3$, $r'_3$, and $r_5$=0 and 1,
with the proviso that $r'_1+r''_1+r'_2+r''_2+r'_3+r''_3+r_4+r_5$ is less than or equal to 2,
$R_1$ and $R_2$ represent a hydrogen atom,
(E2) is an isomer or a mixture of isomers of the same general formula as (E1) except that $R_1$ and $R_2$ represent methyl and he indices r are replaced by s and have the same meaning, and
(E3) is an isomer or a mixture of isomers of the same general formula as (E1) except that $R_1$ and $R_2$ are different and represent a hydrogen atom or a methyl radical and the indices r are replaced by t and have the same meaning.

2. The heat transfer fluid as claimed in claim 1, wherein said fluid comprises a polyphenylmethane composition (I) which contains more than 99% by weight of compounds having 2 and 3 aromatic nuclei expressed products of formula (A) in which $n_1+n_2=0$ and $n_1+n_2=1$.

3. The heat transfer fluid as claimed in claim 1, wherein said fluid comprises polyphenylmethane composition (II) consisting essentially of from 95% to 98% by weight of isomers of dibenzyltoluene express as products of formula (C) in which $p1+p2=1$ and from 2% to 5% by weight of ditolylphenylmethane.

4. The heat transfer fluid as claimed in claim 1, wherein said fluid comprises a polyphenylmethane composition (II) which contains at least 70% by weight of a mixture of isomers of benzyltoluene products of formula (C) in which $p1=p2=0$, at least 20% by weight of isomers of dibenzyltoluene products of formula (C) in which $p1+p2=1$, and ditolylphenylmethane.

5. The heat transfer fluid as claimed in claim 1, wherein said fluid contains at least one mixture of isomers of formula (Y) which is in a mixture with the following compounds (Y1) and (Y2):
(Y1) is a mixture of monobenzylation compounds of (Y), of formulae:

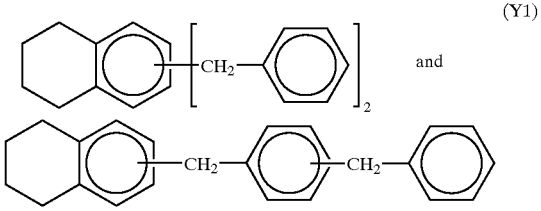

(Y1)

(Y2) is a mixture of mono- or polybenzylation compounds of (Y1), of formulae:

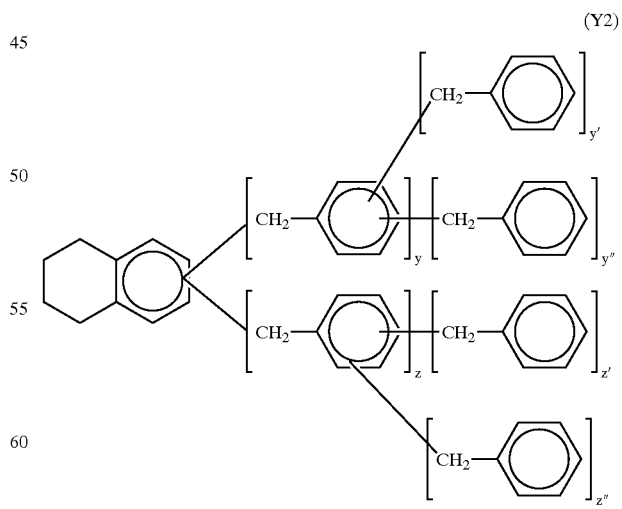

(Y2)

where y and z=0, 1 or 2; y', y", z', z"=0 or 1, with the proviso that y+z is never 0, that $y'+y"+z'+z" \geq 1$, and that $y+z+y'+y"+z'+z" \geq 3$.

6. The heat transfer fluid as claimed in claim 5, wherein the mixture of compounds of formulae (Y), (Y1), and (Y2) contains said compounds in the following proportions by weight:
compounds of formula (Y)—between 60% and 90%,
compounds of formula (Y1)—between 9% and 35%,
compounds of formula (Y2)—between 0.1 and 10%.

7. The heat transfer fluid as claimed in claim 6, wherein the mixture of compounds of formulae (Y), (Y1), and (Y2) comprises:
80% by weight of compounds of formula (Y),
19% by weight of compounds of formula (Y1),
1% by weight of compounds of formula (Y2) in which $y+z+y'+y''+z'+z''=3$.

8. The heat transfer fluid as claimed in claim 1, wherein said fluid comprises at least 50% by weight of at least one composition of polyphenylmethanes (I), (II), (III) or (IV).

9. The heat transfer fluid as claimed in claim 8, wherein said fluid comprises at least 75% by weight of at least one composition of polyphenylmethanes (I), (II), (III) or (IV).

10. The heat transfer fluid as claimed in claim 1, wherein said fluid comprises at least 50% by weight of at least one composition of polyphenylmethanes (I), (II), (III) or (IV) and the remainder of said fluid to 100% by weight comprises a mixture of isomers of formulae (Y).

11. A process for preparing a heat transfer fluid according to claim 5, comprising:
preparing a mixture of compounds (Y), (Y1), and (Y2), wherein benzyl chloride is reacted with a molar excess of 1,2,3,4-tetrahydronaphthalene in the presence of an inorganic halide at a temperature of between 30° C. and 150° C., and
combining said mixture of compounds (Y), (Y1) and (Y2) with at least one composition of polyphenylmethanes (I), (II), (III) or (IV).

12. The process as claimed in claim 11, wherein after having removed the molar excess of 1,2,3,4-tetrahydronaphthalene, the excess inorganic halide is removed and then a fractional distillation is carried out under reduced pressure.

13. The process as claimed in claim 11, wherein the inorganic halide is $FeCl_3$.

14. The heat transfer fluid as claimed in claim 1, wherein said fluid comprises composition I.

15. The heat transfer fluid as claimed in claim 1, wherein said fluid comprises composition II.

16. The heat transfer fluid as claimed in claim 1, wherein said fluid comprises composition III.

17. The heat transfer fluid as claimed in claim 1, wherein said fluid comprises composition IV.

18. The heat transfer fluid as claimed in claim 1, wherein said (a) further comprises a mixture of partially hydrogenated polyphenyls.

19. The heat transfer fluid:
(a) a mixture of partially hydrogenated polyphenyls; and
(b) at least one polyphenylmethane composition selected from:
compositions (I) comprising a mixture of products of formula (A):

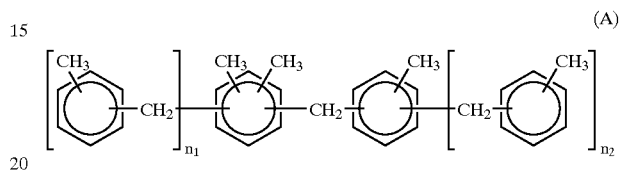

(A)

in which $n_1$ and $n_2=0$ or 1 and which compromises products (A) wherein $n_1+n_2=0$ and products (A) wherein $n_1+n_2=1$, and of products of formula (B):

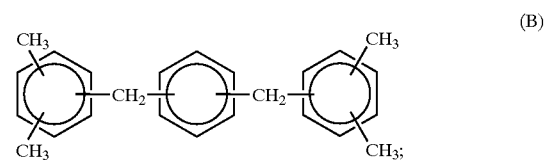

(B)

compositions (II) comprising a mixture of two products (C) and (D), in which:
the product (C) is a mixture of isomers of formula:

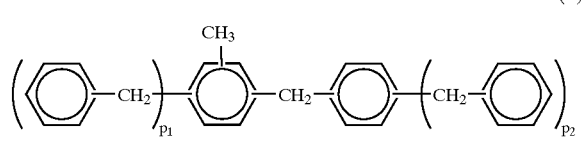

(C)

where $p_1$ and $p_2=0.1$ and 2, with the proviso that $p_1+p_2 \leq 3$, and the product (D) is a mixture of isomers of formula:

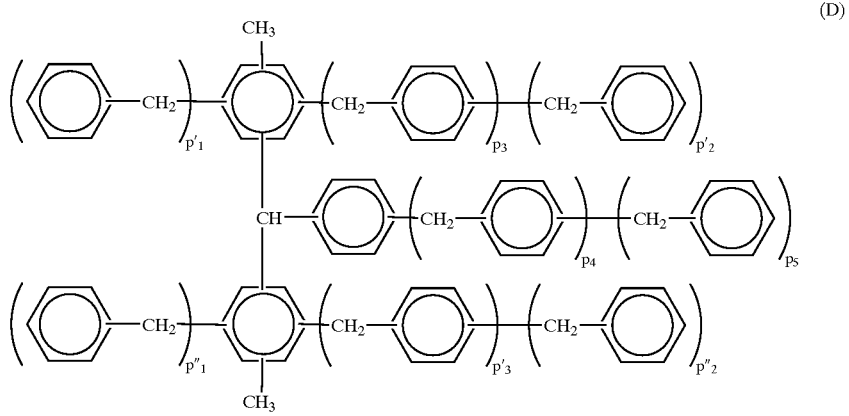

(D)

where $p'_1$, $p''_1$, and $p_4$ 0.1 and 2
$p'_2$, $p''_2$, $p_3$ and $p_5$ = 0 and 1
with the proviso that $p'_1+p''_1+p'_2+p''_2+p_3+p'_3+p_4+p_5 \leq 2$;

compositions (III) comprising a mixture of two products (A1) and (A2) wherein:

the product (A1) is a mixture of isomers of formula:

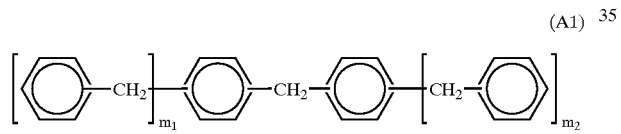

(A1)

where $m_1$ and $m_2$ = 0. 1 or 2, with the proviso that $m1+m2 \leq 3$, the product (A2) is a mixture of isomers of formula:

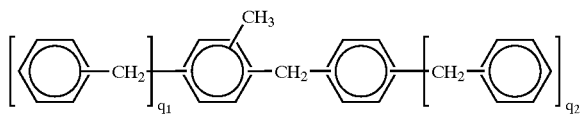

(A2)

where $q_1$ and $q_2$ = 0,1 or 2, with the proviso that $q_1+q_2 \leq 3$, and in that at least one of the compounds (A1) and (A2) comprises an isomer having three benzene nuclei; and compositions (IV) comprising the two products (A1) and (A2) and at least one compound selected from the following products (E1), (E2) or (E3):

(E1) is an isomer or a mixture of isomers of formula:

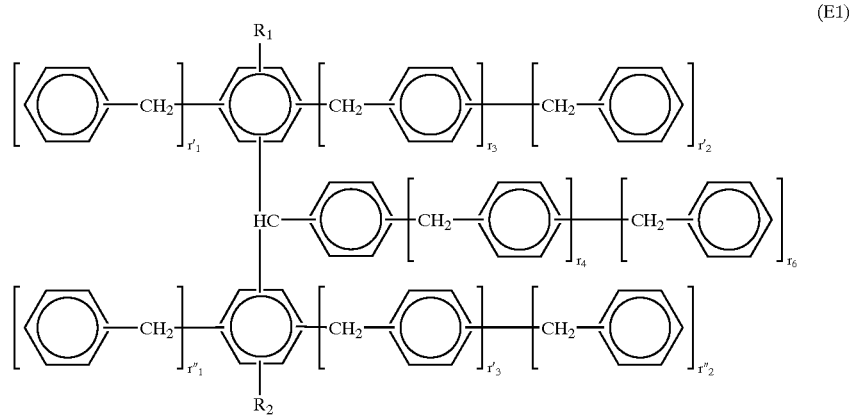

(E1)

where $r'_1$, $r''_1$, and $r_4 = 0$, 1 or 2, $r'_2$, $r''_2$, $r_3$, $r'_3$, and $r_5 = 0$ and 1, with the proviso that $r'_1 + r''_1 + r'_2 + r''_2 + r'_3 + r''_3 + r_4 + r_5$ is less than or equal to 2, $R_1$ and $R_2$ represent a hydrogen atom, (E2) is an isomer or a mixture of isomers of the same general formula as (E1) except that $R_1$ and $R_2$ represent methyl and the indices r are replaced by s and have the same meaning, and (E3) is an isomer or a mixture of isomers of the same general formula as (E1) except that $R_1$ and $R_2$ are different and represent a hydrogen atom or a methyl radical and the indices r are replaced by t and have the same meaning.

20. In a heat transfer process comprising transferring heat to a heat transfer fluid having a temperature of 320–370° C., the improvement wherein said heat transfer fluid is the heat transfer fluid as claimed in claim 1.

21. The heat transfer fluid as claimed in claim 5, wherein said fluid comprises at least 50% by weight of at least one composition of polyphenylmethanes (I), (II), (III) or (IV) and the remainder of said fluid, to 100% by weight, comprises a mixture of compounds (Y), (Y1), and (Y2).

22. A heat transfer fluid according to claim 1, wherein said fluid contains a mixture of isomers of formula (Y) which comprises 5-benzyl-1,2,3,4-tetrahydronaphthalene and 6-benzyl-1,2,3,4-tetrahydronaphthalene.

23. A process for preparing a heat transfer fluid according to claim 1, comprising:

preparing a mixture of isomers of formula (Y) or a mixture of isomers of formula (Y) and compounds (Y1) and (Y2) wherein (Y1) is a mixture of monobenzylation compounds of (Y), of formulae:

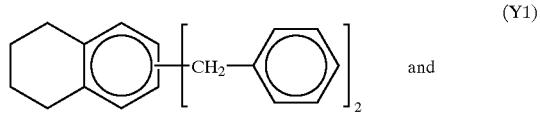

(Y1)

and

-continued

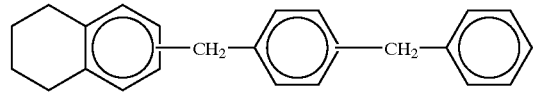

(Y2) is a mixture of mono- or polybenzylation compounds of (Y1), of formulae:

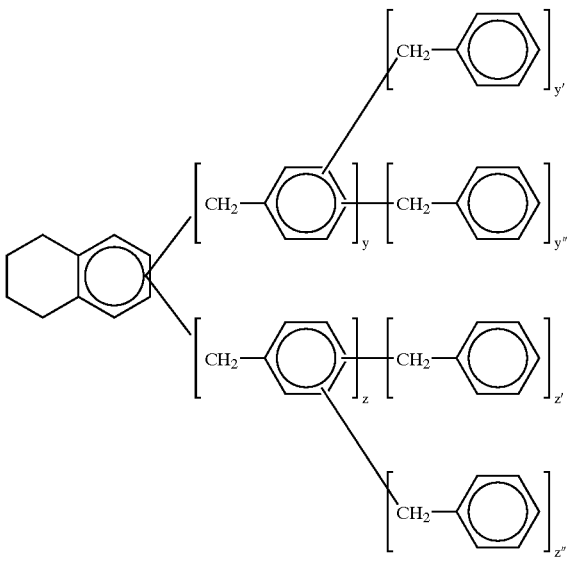

(Y2)

where y and z = 0, 1 or 2; y', y'', z', z'' = 0 or 1, with the proviso that y+z is never 0, that $y'+y''+z'+z'' \geq 1$, and that $y+z+y'+y''+z'+z'' \geq 3$, by reacting benzyl chloride with a molar excess of 1,2,3,4-tetrahydronaphthalene in the presence of an inorganic halide or a protic acid; and combining said mixture of isomers of formula (Y) or mixture of isomers of formula (Y) and compounds (Y1) and (Y2) with at least one composition of polyphenylmethanes (I), (II), (III) or (IV).

* * * * *

UNITED STATES PATENT AND TRADEMARK OFFICE
CERTIFICATE OF CORRECTION

PATENT NO. : 7,011,765 B2
APPLICATION NO. : 10/240093
DATED : March 14, 2006
INVENTOR(S) : Raymond Commandeur It is certified that error appears in the above-identified patent and that said Letters Patent is hereby corrected as shown below:

Column 14, line 25 reads
"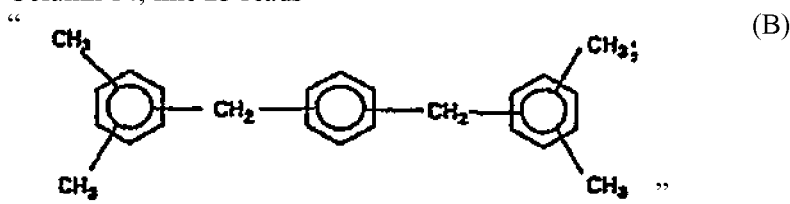 (B) "

should read --

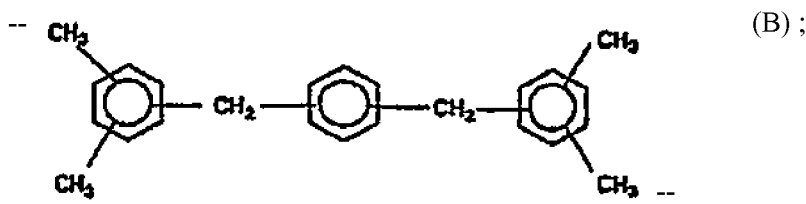 (B) ;

Column 14, line 43 reads "0.1 and 2." should read --0,1 and 2--
Column 14, line 64 reads "0.1 and 2." should read --0,1 and 2--
Column 15, line 14 reads "m1+m$_2$" should read --m$_1$+m$_2$--
Column 15, line 58 reads " and he indices" should read --and the indices--
Column 16, line 6 reads "express as" should read --expressed as--
Column 17, line 26 reads "fluid to 100% by weight" should read --fluid, to 100% by weight, --
Column 18, line 1 reads "fluid:" should read --fluid, compromising:--
Column 18, line 56 reads "0.1 and 2." should read --0,1 and 2--
Column 19, line 25 reads "p$_4$0.1 and 2" should read --p$_4$=0,1 and 2--
Column 19, line 43 reads "m1+m$_2$" should read --m$_1$+m$_2$--

UNITED STATES PATENT AND TRADEMARK OFFICE
CERTIFICATE OF CORRECTION

PATENT NO. : 7,011,765 B2
APPLICATION NO. : 10/240093
DATED : March 14, 2006
INVENTOR(S) : Raymond Commandeur It is certified that error appears in the above-identified patent and that said Letters Patent is hereby corrected as shown below:

Column 20, at the bottom, in formula (E1) reads "$r_6$" should read --$r_5$--

Signed and Sealed this

Twenty-sixth Day of December, 2006

JON W. DUDAS
*Director of the United States Patent and Trademark Office*